Figure 1:
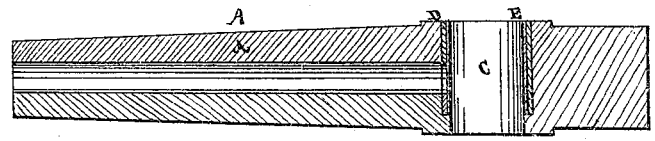

A. D. Smith.
Faucet Packing

No. 121,430.  Patented Nov. 28 1871.

Witnesses.  Inventor.
Alpheus D. Smith

Chas Dickinson
W. W. Richardson

UNITED STATES PATENT OFFICE.

ALPHEUS D. SMITH, OF GRAFTON, OHIO.

IMPROVEMENT IN FAUCETS.

Specification forming part of Letters Patent No. 121,430, dated November 28, 1871.

*To all whom it may concern:*

Be it known that I, ALPHEUS D. SMITH, of Grafton, in the county of Lorain and State of Ohio, have invented certain Improvements in Faucets, of which the following is a specification:

The nature of my invention in faucets consists in providing the aperture in which the gate moves with a soft elastic lining, concentrically within which is arranged a hard spring or yielding lining, which is made to sustain its proper relation to the gate by the action of the adjustable soft elastic lining, for the purpose hereinafter set forth, in which—

Figure 1 is a sectional view, showing the combined hard spring and soft elastic spring-linings as applied to faucets.

The gate and body of the faucet A may be made of wood or other suitable material in the ordinary manner. C is an aperture in the body of the faucet A, in which the gate turns to open and close the discharge-channel. D is a soft elastic lining, of rubber or other suitable material, within the aperture C. E is a hard spring or yielding lining, placed concentrically within the soft elastic lining D, by which it is firmly held to its just relation to and around the gate. Both of the linings D and E are left open adjoining the outer end of the faucet, or nearly opposite the discharge-channel, for the purpose of permitting the soft elastic lining D to expand together around the aperture C when the gate is put into its proper place, while the hard lining E is expanded open from the same cause if the gate is made of the proper size.

The advantages resulting from the above-described arrangement of linings D and E are as follows: It is well known to those having extensive use of wood faucets that when the gate-seat is in a soft substance the fiber of the wood of the gate on being soaked becomes so raised as to present a rough surface, which, on being used a little, so cuts and wears out the soft lining and itself as to become worthless in a short time. Then, again, if a hard lining be used alone, and the gate be made tight enough to hold when dry, it will, on becoming soaked, be so tight as to be worthless, or will soon become so, if it is a gate of an even diameter, or has a shoulder to prevent it passing through the aperture C. My combined linings also compensate for the uneven manner in which a round gate or hole in wood will shrink or swell more on one side than on the opposite, for the reason that wood shrinks and swells the most across and around the heart of a tree and less and less as it nears it, which is the reason a board cut from the outside of a log will warp when seasoned in the shade; and for the same reason the gate and aperture in which it is placed will not shrink or swell a regular oval round, rendering the parts unadapted to work together and make a fluid-tight joint; hence the necessity of a soft elastic lining to compensate for the uneven imperfections and for the natural wear, &c., while it is just as important to have a hard spring or yielding lining to insure durability by burnishing down the fiber of the wood of the gate with the hard smooth surface of the lining; and it will be readily seen that by the arrangement and use of the two different linings the objections to either when used separately is overcome, while the desirable features of both are rendered effective, whereby there is obtained unto them the harmlessness and purity of wood with the durability of metal.

What I claim as my invention is—

A faucet the gate-seat of which is lined with a soft elastic substance, and having concentrically within this a hard spring or yielding metal lining, which shall always hold its just relation to the gate by the action of the adjoining soft elastic lining, and by which the imperfections caused by shrinking or swelling or from the natural wear may be compensated for, substantially in the manner and for the purpose set forth.

ALPHEUS D. SMITH.

Witnesses:
CHAS. DICKINSON,
W. W. RICHARDSON.

(167)